Figure 1:
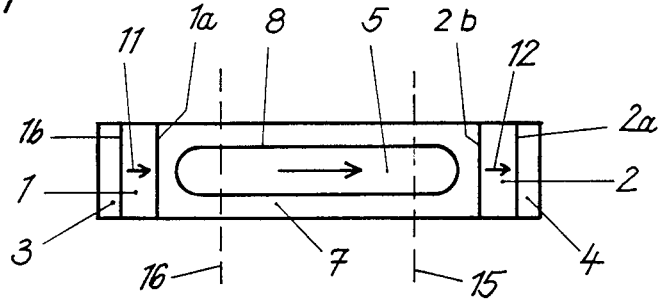

United States Patent [19]

Normann et al.

[11] Patent Number: 4,862,303
[45] Date of Patent: Aug. 29, 1989

[54] MAGNETIC INSTRUMENT FOR READING TELEGRAPHIC SIGNALS

[75] Inventors: Norbert Normann, Pforzheim; Erwin Gross, Karlsruhe; Harald Schlager, Rheinstetten, all of Fed. Rep. of Germany

[73] Assignee: Doduco KG. Dr. Eugen Durrwachter, Pforzheim, Fed. Rep. of Germany

[21] Appl. No.: 116,638

[22] Filed: Nov. 3, 1987

[30] Foreign Application Priority Data

Nov. 3, 1986 [DE] Fed. Rep. of Germany ....... 3637320

[51] Int. Cl.$^4$ .......................... G11B 5/27; H02M 5/10
[52] U.S. Cl. ......................... 360/110; 360/2; 360/123; 360/125; 307/419
[58] Field of Search ..................... 360/2, 55, 110, 123, 360/125, 112; 365/133; 307/419; 235/449–450, 493

[56] References Cited

U.S. PATENT DOCUMENTS

| | | | |
|---|---|---|---|
| 4,242,789 | 1/1981 | Fox | 360/2 X |
| 4,593,209 | 6/1986 | Sloan | 360/112 X |
| 4,736,122 | 4/1988 | Opie | 360/112 X |

OTHER PUBLICATIONS

Publication—Technisches Messen—Publication No. 4 of 1984.

Primary Examiner—A. J. Heinz
Attorney, Agent, or Firm—Balogh, Osann, Kramer, Dvorak, Genova & Traub

[57] ABSTRACT

A reader for a disk-shaped carrier with Wiegand wires is described which manages with only two permanent magnets (1, 2). The variation of the magnetic field needed for detecting the Wiegand wires is effected by flux concentrating pieces (3, 4, 7) attached to the permanent magnets (1, 2). In order to be able to read the carrier with the Wiegand wires without change when it is inserted into the reader rotated by 180° round its longitudinal axis coinciding with the direction of insertion (14), the flux concentrating pieces (3, 4, 7) are arranged symmetrically with respect to the longitudinal axis (14) which is a two-fold axis of symmetry. To pickup the Wiegand pulses, two E-shaped soft magnetic cores (9) are provided which carry on their center leg an electrical sensor winding (17). The free ends of the legs of the E-shaped cores (9) face one another and are also arranged symmetrically with respect to the longitudinal axis (14).

15 Claims, 2 Drawing Sheets

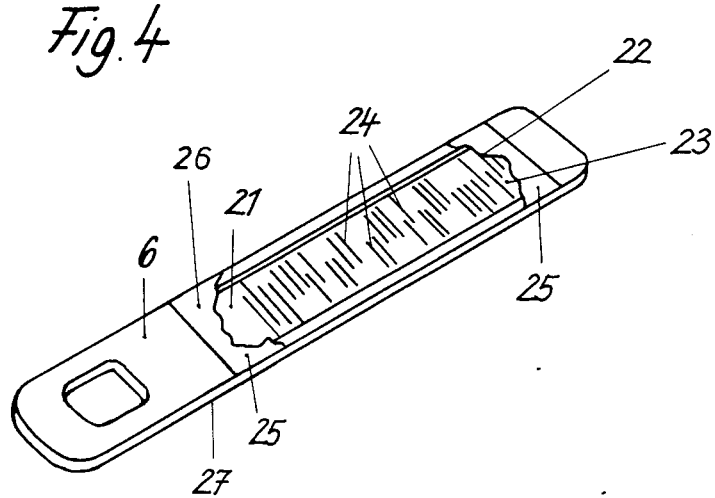

MAGNETIC INSTRUMENT FOR READING TELEGRAPHIC SIGNALS

The invention is based on a magnetic reader having the features specified in the introductory clause of claim 1. In EP-0,025,596 A1 a read head is described which exhibits all features of the introductory clause of claim 1, with the exception of the slot for the carrier with the Wiegand wires and the guide parts which delimit the slot and guide the carrier along a predetermined path in the slot. Such guidance is normal and necessary in order to ensure that the Wiegand wires are subjected to a reproducible magnetic force flux when their carrier is displaced in the slot.

The construction and method of functioning of Wiegand wires are described in EP-0,025,596 A1 and in DE-OS 3,340,600. The last-mentioned printed document also contains information concerning other bistable magnetic elements (briefly called BMEs in the text which follows) which have similar characteristics to Wiegand wires.

The read head known from EP-0,025,596 has an E-shaped soft magnetic core the center leg of which carries a sensor winding. The E-shaped core is located between two permanent magnets which are arranged to be approximately antiparallel, the arrangement being made in such a manner that, imagining the E to be standing up, one permanent magnet is located above the top leg of the E and the other permanent magnet is located below the bottom leg of the E and the pole faces enclose an angle of approximately 160° with the plane spanned by the legs of the E. At some distance from the plane spanned by the legs of the E, a third permanent magnet is located which generates between itself and the E core a magnetic field which is directed oppositely to the magnetic field generated by the two other permanent magnets in this area.

In the known read head, the Wiegand wires are guided with their carrier along a path of movement which extends in the immediate vicinity of the ends of the three legs of the E core so that the legs are directed towards the carrier. The known reading head operates in such a manner that the carrier is first moved along the third permanent magnet in the strong field of which the Wiegand wires are magnetically saturated so that their soft magnetic core and their hard magnetic shell exhibit the same direction of magnetization. As it approaches the E core, each Wiegand wire passes into a magnetic field of the opposite direction which is generated by the two permanent magnets adjacent to the E core and causes the soft magnetic core of the Wiegand wire to reverse its direction of magnetization (this process is called magnetic restoration of the Wiegand wire).

In the course of the further movement of the carrier, the Wiegand wires pass into an area in which the direction of the magnetic force flux is again reversed (this is the field generated by the rear pole faces of the two permanent magnets adjacent to the E core). In this area of the magnetic field, the direction of magnetization of the soft magnetic core of each Wiegand wire is abruptly reversed and again corresponds to the direction of magnetization of the hard magnetic shell. In order to be able to adequately pick up the change in the magnetic force flux occurring when the soft magnetic core switches from the antiparallel direction to the parallel direction of magnetization, the E-shaped core is arranged in such a manner that the free ends of its legs are located as close as possible to the point at which this changeover occurs in each case. The consequence is that the point at which the soft magnetic core of the Wiegand wires switches from the parallel direction to the antiparallel direction of magnetization is located at a slightly greater distance from the E-shaped core so that the change in magnetic force flux then occurring can be less well picked up by the sensor winding on the E core. Only the voltage pulse occurring in the sensor winding during the switching in the direction of magnetization of the soft magnetic area from the antiparallel direction to the parallel direction of magnetization is used for evaluation.

The carrier which is moved past the E-shaped core has two rows of Wiegand wires one of which is moved past the ends of the upper and the center leg and the other one of which is moved past the ends of the center and the lower leg of the E-shaped core. The consequence is that the Wiegand wires of one row produce pulses of the opposite polarity in the sensor winding to the Wiegand wires of the other row. The different polarity can therefore be used for determining in which of the two rows the respective Wiegand wire is located. This makes it possible to use the read head to read binary coded information item which is contained in the arrangement of the Wiegand wires in two rows of the carrier if the significance "0" is allocated to the wires in one row and the significance "1" to the wires in the other row in each case.

In the known read head, the permanent magnets and the E-shaped core with the sensor winding are all on one and the same side of the path along which the carrier with the Wiegand wires is guided past the permanent magnets and the E-shaped core. In order to be able to subject the Wiegand wires to a sufficiently strong magnetic field and in order to be able to pick up as strong as possible a change in the magnetic force flux during remagnetization of the Wiegand wires in the sensor winding, this path extends as closely as possible to the permanent magnets and the E-shaped core and, for the same reason, the Wiegand wires are embedded into a thin multi-layer card similar to a check or credit card of plastic, have therefore only a small distance from the surfaces of the card and can be moved correspondingly closely past the permanent magnets and the E-shaped core.

In order to be able to correctly read the information contained in the arrangement of the Wiegand wires on the card-shaped carrier, the carrier must be moved along the read head in a predetermined orientation. If the carrier is reversed so that its other surface faces the permanent magnets and the E-shaped core, the read head reads a different information item or no information at all. A further disadvantage of the known read head consists in the fact that, due to the arrangement of a third permanent magnet in addition to the two permanent magnets arranged on both sides of the E-shaped core, it has a relatively great constructional length which requires correspondingly long carriers for the Wiegand wires because each ferromagnetic wire must be conducted past all magnets when inserting the carrier. Neither can the distance of the third permanent magnet from the two other permanent magnets be arbitrarily reduced because their magnetic fields would otherwise weaken each other too much and remagnetization of the Wiegand wires would no longer be possible.

The invention is based on the object of creating a magnetic reader which has as short as possible a constructional length and allows a carrier with Wiegand wires to be inserted into the slot and read in the two possible orientations of the large surfaces of the carrier.

This object is achieved by a reader having the features specified in claim 1.

Advantageous further developments of the invention are the subject matter of the subclaims.

The result of the symmetrical arrangement of the two E-shaped cores and of the free ends of the two first flux concentrating pieces is that a carrier having two rows of Wiegand wires or wire-shaped bistable magnetic elements of similar characteristics can be inserted rotated by 180° around its longitudinal center line, which coincides with the direction of insertion, and that the binary coded information contained on it can be correctly read out in both orientations of the carrier. Depending on the orientation of the carrier, the electric voltage pulses are generated by magnetic induction in the sensor winding which is closest to the Wiegand wires changing their direction of magnetization. For this purpose, the two sensor windings are preferably electrically connected to one another in series because only one common evaluating circuit is then needed for the two sensor windings.

In contrast to the known read head, the reader according to the invention only has two permanent magnets; the third permanent magnet provided for the magnetic saturation of the Wiegand wires in the known read head has been omitted in the reader according to the invention in which the magnetic saturation, the magnetic restoration and also the triggering of the Wiegand pulses is effected by the same two permanent magnets. The magnetic field with high field strength, required for the magnetic saturation of the Wiegand wires, is generated at a point located in front of the permanent magnets between the free ends of the first two flux concentrating pieces facing one another. For the magnetic restoration of the Wiegand wires, a less strong magnetic field is needed than for their magnetic saturation. This is why a magnetic short circuit is produced by a third flux concentrating piece between the two pole faces of the permanent magnets which are not occupied by the first two flux concentrating pieces and, as a result, the magnetic field between these two pole faces is weakened, the construction and arrangement of the third flux concentrating piece being made in such a manner that the magnetic field weakened by the magnetic short circuit is still strong enough to effect the magnetic restoration of the Wiegand wires. By omitting a separate permanent magnet for the magnetic saturation of the Wiegand wires and by providing a magnetic short circuit between two of the pole faces of the remaining two permanent magnets in conjunction with the resultant reduced mutual influence of the magnetic field for the saturation of the Wiegand wires, on the one hand, and of the magnetic field for their restoration, on the other hand, a much shorter constructional length of the reader is possible than in the case of the known read head.

The absence of a separate permanent magnet for the magnet saturation of the Wiegand wires results in a different type of movement of the carrier in the reader according to the invention than in the case of the known read head: in the case of the known read head, the information located on the carrier is read in passing, that is to say the carrier is inserted into the end of the slot adjacent to the saturation magnet and removed again at the opposite end of the slot. During this process, the Wiegand wires first pass through the area of the magnetic saturation field, then the area of the oppositely directed magnetic restoration field and then again an area with a magnetic field which is directed oppositely to the restoration field and is used for triggering the Wiegand pulses. In the reader according to the invention, the carriers are inserted into the slot from the end where the free ends of the first two flux concentrating pieces are located between which the magnetic saturation field exists. The Wiegand wires located on the carrier thus also first pass through the area of the magnetic saturation field and then pass into the area of the oppositely directed magnetic restoration field. If carried further in the original direction of movement, however, the Wiegand wires would not again pass into a magnetic field which is directed oppositely to the magnetic restoration field; this is why the direction of movement of the carrier is reversed after immersion into the magnetic restoration field so that the Wiegand wires again pass into the magnetic saturation field in which the Wiegand pulses are triggered even with a relatively low field strength. The free ends of the two E-shaped cores are brought towards this area where the Wiegand pulses are triggered. The reader according to the invention is thus an insertion-type reader: the carrier with the Wiegand wires is inserted into the slot of the reader, preferably up to a stop in order to ensure that all Wiegand wires are inserted deeply enough into the magnetic restoration field, and then the carrier is retracted again. During the insertion, the Wiegand wires are put into a state of magnetization from which the Wiegand pulses can be triggered. During the subsequent retraction of the carrier, the Wiegand pulses are then triggered and picked up by one or the other sensor winding.

In order to be able to insert the carrier into the reader in the two possible orientations it is basically sufficient to arrange the two E cores and the free ends of the first two flux concentration pieces symmetrically with respect to the longitudinal center line of the slot. Preferably, however, the entire magnetic arrangement is constructed symmetrically with respect to this longitudinal center line of the slot, preferably also mirror-symmetrically with respect to the two main planes, which are perpendicular to one another, of the slot which contain the longitudinal center line of the slot. However, the last-mentioned mirror-symmetrical arrangement presupposes that the two rows of the carrier in which the Wiegand wires are arranged extend mirror-symmetrically with respect to the plane containing the longitudinal center line of the carrier and extending perpendicularly with respect to the long side of the carrier.

Particularly in this case, it is especially advantageous to use a carrier having the features specified in claim 9; as a result of the fact that the Wiegand wires are closer to the one than to the other surface in this carrier, it is at least achieved that Wiegand pulses occurring are picked up with a higher signal amplitude by the E-shaped core closer to the Wiegand wires than by the opposite E-shaped core. In the case of electrically series-connected sensor windings, therefore, a resultant pulse remains from the two electric voltage pulses with opposite polarity which are produced by induction in the two sensor windings from a triggered Wiegand wire whereas the pulses occurring in the two sensor windings would mutually cancel if a carrier is used in which the Wiegand wires are arranged in the center between the surfaces of the carrier in such a manner that they influence the two E cores with approximately the same strength. In the area between the Wiegand wires on the one hand and the more remote surface, on the other hand, the carrier is preferably formed of a non-magnetic metal, particularly of electrically highly conductive aluminum which keeps Wiegand pulses, induced by eddy current damping in the sensor winding on the E-shaped core more remote from the ferromagnetic wires, relatively small in comparison with the pulses in the opposite sensor winding. In contrast, the Wiegand wires are suitably separated from the near-side surface only by one or two non-magnetic thin coverfoils, for example of a plastic or of stainless steel.

The third flux concentrating piece partially shorting the two permanent magnets must be arranged in such a manner that the remaining weakened magnetic field is sufficient for magnetically restoring the Wiegand wires in both orientations of the carrier. This is best achieved by constructing the third flux concentrating piece in such a manner that it encloses the slot into which the carrier is inserted, for example in such a manner that the third flux concentrating piece, having a slot-shaped opening, becomes a part of the insertion slot for the carrier. The stray magnetic field existing in this slot-shaped opening is the magnetic field for the restoration of the Wiegand wires.

Due to such a slot-shaped opening, the third flux concentrating piece can become a guide part for the carrier. The first two flux concentrating pieces can also be constructed in similar manner to become guide parts for the carrier, for example by constructing them to be bifurcated at their free ends and arranging them in such a manner that the narrow sides of the slot extending between them are located between the legs forming the fork. This has the further advantage that the magnetic field lines do not enter the Wiegand wires axially from the ends but at a greater angle with respect to the axis through the shell surface of the Wiegand wires which is of advantage for the magnetic action of the Wiegand wires.

The attached drawing diagrammatically shows a preferred typical embodiment of the reader according to the invention and of a carrier with Wiegand wires which is particularly suitable for this reader.

Figure 2:
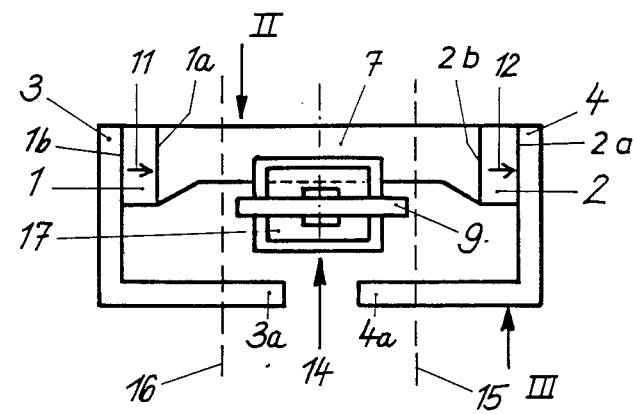
Figure 3:
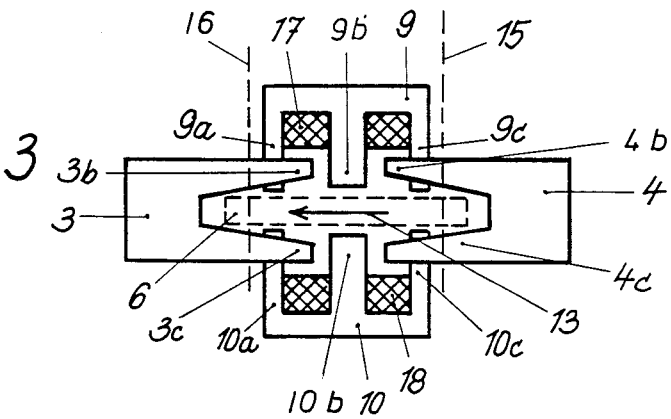

FIG. 1 shows the arrangement of the essential components of the reader in a top view, FIG. 2 shows the rear view of the arrangement shown in FIG. 1 (direction of viewing according to arrow II), FIG. 3 shows the front view of the arrangement shown in FIG. 1 (direction of viewing in direction of arrow III), and FIG. 4 shows a part-sectional view of a carrier with Wiegand wires which can be read by means of the reader shown in FIGS. 1 to 3.

The reader contains two matching permanent magnets 1 and 2, particularly high-performance magnets based on cobalt with a rare earth metal, for example cobalt samarium magnets. These two magnets 1 and 2 are arranged parallel to one another and at a distance from one another with matching direction of magnetization. The two pole faces 1b and 2a, facing away from one another, of the two magnets 1 and 2 each carry a soft magnetic flux concentrating piece 3 and 4 forming an L-shaped angle, the free ends 3a and 4a of which face one another, maintaining a mutual distance. The free ends of the two flux concentrating pieces 3 and 4 are constructed to be bifurcated in mirror image matching manner, the two pairs of legs 3b and 3c and 4b and 4c jointly enclosing a slot 5 into which a carrier 6 with Wiegand wires can be inserted. The two pole faces 1a and 2b, facing one another, of the magnets 1 and 2 are connected to one another by a third soft magnetic flux concentrating piece 7 in which an elongated hole 8 is located which also encloses the slot 5 for inserting the carrier 6. The direction of magnetization of the two permanent magnets is indicated by arrows 11 and 12, the direction of the magnetic force flux in the elongated hole 8 is indicated by an arrow 13 and in the intermediate space between the ends 3a and 4a of the two first flux concentrating pieces 3 and 4 by an arrow 13.

In the area between the ends 3a and 4a of the flux concentrating pieces 3 and 4, on the one hand, and the flux concentrating piece 7, on the other hand, two correspondingly constructed soft magnetic E-shaped cores 9 and 10 are arranged, the three legs 9a, 9b and 9c and 10a, 10b and 10c of which face one another. The E-shaped cores are arranged at a rightangle to the intended direction of movement of the carrier 6 which is indicated by the arrow 14 in FIG. 1 and coincides with the longitudinal center line of the slot 5, the lateral delimitation of which is indicated by the two parallel lines 15 and 16 in FIGS. 1 to 3.

The two cores 9 and 10 carry on their center leg 9b and 10b, respectively, an electrical sensor winding 17 and 18, respectively. The two sensor windings are electrically connected to one another in series. The two cores 9 and 10 are closer to the flux concentrating piece 7 than to the free ends 3a and 4a of the flux concentrating pieces 3 and 4.

The carrier 6 shown in FIG. 4 consists of a flat rectangular piece of aluminum which, for example, has a thickness of 2 mm, a width of 18 mm and a length of 75 mm. Into this piece of aluminum, a trough 21 with a depth of approximately 0.4 mm is stamped on one side into which a thin plastic strip is inserted into which two rows 22 and 23 of Wiegand wires are embedded. The plastic strip can be, for example, two adhesive strips which are bonded to one another, the Wiegand wires 24 having been placed between them. The trough 21 is closed with a foil 25 of non-magnetic stainless steel. In this manner, the Wiegand wires 24 are located very closely to one surface of the carrier 20, this being the surface 26 covered by the stainless steel foil 25. The Wiegand wires 24 are separated by 1.6 mm of aluminum from the opposite surface 27.

If such a carrier is inserted into the insertion reader shown in FIGS. 1 to 3 with the stainless steel foil 25 pointing upwards, the Wiegand wires first pass through the strong magnetic field generated between the ends 3a and 4a of the flux concentrating pieces 3 and 4 and are magnetically saturated in this field, for which a field strength of approximately 80 A/m is required. As the third flux concentrating piece 7 is approached, this magnetic saturation field weakens; the direction of the magnetic force flux is reversed in the area between the E-shaped cores 9 and 10 and the third flux concentrating piece 7 and in the area of the elongated hole 8 of the flux concentrating piece 7, the Wiegand wires 24 are magnetically restored, that is to say the soft magnetic core of the Wiegand wires which has first been magnetized in parallel with the hard magnetic shell of the Wiegand wires in the magnetic saturation field reverses its direction of magnetization and is then magnetized in antiparallel to the hard magnetic core. A field strength of about 16 A/m is typically needed for this remagnetization. The carrier is inserted far enough for all Wiegand wires 24 to have passed through the elongated hole 8 in the flux concentrating piece 7. An end stop, not shown here, is suitably provided at an appropriate distance behind the flux concentrating piece 7. After the end stop has been reached, the carrier 6 is retracted. During the retraction movement, the Wiegand wires 24 again pass into the influence of the magnetic saturation field generated between the free ends of the flux concentrating pieces 3 and 4. Shortly after entering the magnetic saturation field, with a low field strength of even just a few A/m, the soft magnetic core of the Wiegand wires is abruptly remagnetized and is then again magnetized in the same direction as the hard magnetic shell. The surge of induction occurring during this remagnetization is essentially picked up by the adjacent sensor winding 17. To obtain a high signal yield, the ends of the three legs 9a, 9b and 9c and 10a, 10b and 10c of the E-shaped cores are directed exactly towards the point at which this changeover of the direction of magnetization of the soft magnetic core from its antiparallel direction to the orientation parallel to the direction of magnetization of the shell is expected (this changeover is also called the triggering of the Wiegand pulses). The Wiegand wires in the one row 22 are positioned where there are gaps in the other row 23, and vice versa. The consequence is that the Wiegand wires of row 22 generate Wiegand pulses of the opposite polarity to the Wiegand wires of row 23. This makes it possible to provide a binary coding by means of the spatial arrangement of the Wiegand wires 24 in the two rows 22 and 23: the Wiegand wires in the one row 22 are located where there are gaps in the other row 23, and vice versa.

If the carrier 6 is reversed so that the stainless steel foil 25 and the Wiegand wires 24 behind it point downwards the corresponding pulses are essentially picked up by the lower sensor winding 18. The information read during this process is the same as in the opposite case.

We claim:

1. Magnetic reader for a disk-shaped carrier into which two parallel rows of mutually parallel Wiegand wires or wire-shaped bistable magnetic elements (BMEs) of similar characteristics are embedded which extend transversely to the longitudinal direction of the rows which corresponds to the direction of movement of the carrier during reading, with a slot which is limited by guide parts and into which the carrier is introduced for reading and which defines the direction of movement of the carrier, with two permanent magnets which are arranged in the vicinity of the slot in such a manner that the magnetic field generated by them has, behind one another in the direction of movement, two zones with oppositely directed field strength vectors extending transversely to the direction of movement, and with an inductive sensor, wherein two E-shaped ferromagnetic cores (9, 10) extending transversely to the direction of movement are provided for forming the sensor, which are located on opposite long sides of the slot (5) and the three legs of which are directed towards the long side of the slot (5), two cores (9, 10) carry on their center leg (9b, 10b) an electrical sensor winding (17, 18), the north pole face (1b) of the first permanent magnet (1) is connected to a first flux concentrating piece (3) and the south pole face (2a) of the second permanent magnet (2) is connected to a second flux concentrating piece (4), these two flux concentrating pieces (3, 4) are located on different sides of the main plane extending perpendicularly to the long side of the insertion slot (5) and containing its longitudinal center line (14) and their free ends (3a, 4a) face each other, the south pole face (1a) of the first permanent magnet (1) and the north pole face (2b) of the second permanent magnet (2) are connected to one another by a third flux concentrating piece (7), the E-shaped cores (9, 10) are arranged between the free ends (3a, 4a) of the first two flux concentrating pieces (3, 4) on one hand and the third flux concentrating piece (7) on the other hand, and the cores (9, 10) and the free ends (3a, 4a) of the first two flux concentrating pieces (3, 4) are mirror symmetrically arranged with respect to the longitudinal center line (14) of the slot (5)

2. Reader as claimed in claim 1, wherein the two magnets (1, 2) and the third flux concentrating piece (7) are also mirror symmetrically arranged with respect to the longitudinal center line (14) of the slot (5)

3. Reader as claimed in claim 2, wherein the first and second flux concentrating piece (3, 4) are constructed to be bifurcated at their free end (3a, 4a) and the narrow sides of the slot (5) are located between the legs (3b, 3c; 4b, 4c), forming the fork, of the first and second flux concentrating piece (3, 4), respectively.

4. Reader as claimed in claim 2, wherein the arrangement of the cores (9, 10), magnets (1, 2) and flux concentrating pieces (3, 4, 7) is mirror-symmetrical with respect to the two main planes which are perpendicular to one another and which contain the longitudinal center line (14) of the slot (5).

5. Reader as claimed in claim 1, 2 or 4, wherein the first and second flux concentrating piece (3, 4) are constructed to be bifurcated at their free end (3a, 4a) and the narrow sides of the slot (5) are located between the legs (3b, 3c; 4b, 4c), forming the fork, of the first and second flux concentrating piece (3, 4), respectively.

6. Reader as claimed in claim 4, wherein the first and second flux concentrating piece (3, 4) are constructed to be bifurcated at their free end (3a, 4a) and the narrow sides of the slot (5) are located between the legs (3b, 3c; 4b, 4c), forming the fork, of the first and second flux concentrating piece (3, 4), respectively.

7. Reader as claimed in claim 1, wherein the slot (5) has an insertion depth which is limited by a stop.

8. Reader as claimed in claim 1, wherein the two sensor windings (17, 18) are electrically connected in series with one another.

9. Reader as claimed in claim 1, wherein the third flux concentrating piece (7) encloses the slot (5).

10. Reader as claimed in claim 1, wherein the flux concentrating pieces (3, 4, 7) are guide parts for the carrier (6) which delimit the slot (5).

11. Reader as claimed in claim 1 comprising a disk-shaped carrier in which two parallel rows of mutually parallel Wiegand wires or wire-shaped bi-stable magnetic elements exhibiting similar characteristics are embedded which extend transversely to the longitudinal direction of the rows, wherein the Wiegand wires are located closer to one than to the other of the two large surfaces of the carrier.

12. Reader as claimed in claim 11, wherein said carrier consists of a non-magnetic metal, particularly, of aluminum, in the area between the Wiegand wires and the surface of said carrier which is the most remote from said wires.

13. Reader as claimed in claim 12, wherein said carrier has a thickness of between 1.5 and 3 mm, and has on one side a tub-shaped recess which has a depth of between 0.3 and 0.5 mm, and in which said Wiegand wires are arranged.

14. Reader as claimed in claim 11, wherein said Wiegand wires are separated from the near surface of said carrier by one or more thin-non-magnetic cover foils.

15. Reader as claimed in claim 14, wherein said carrier has a thickness of between 1.5 and 3 mm, and has on one side a tub-shaped recess which has a depth of between 0.3 and 0.5 mm, and in which said Wiegand wires are arranged.

* * * * *